United States Patent [19]

Brandon

[11] Patent Number: 4,697,135
[45] Date of Patent: Sep. 29, 1987

[54] ELECTRONIC VOLTAGE REGULATOR
[75] Inventor: George M. Brandon, Charlotte, N.C.
[73] Assignee: Textron, Inc., Providence, R.I.
[21] Appl. No.: 877,961
[22] Filed: Jun. 24, 1986
[51] Int. Cl.$^4$ .............................................. H02P 9/00
[52] U.S. Cl. ...................................... 322/24; 322/28; 322/29; 322/32
[58] Field of Search ....................... 322/24, 28, 29, 32, 322/63, 90

[56] References Cited
U.S. PATENT DOCUMENTS

| | | | |
|---|---|---|---|
| 3,465,235 | 9/1969 | Schleir et al. | 322/24 |
| 3,539,906 | 11/1970 | Habock | 322/24 |
| 4,368,417 | 1/1983 | Matsuyama | 322/29 |

Primary Examiner—R. J. Hickey
Attorney, Agent, or Firm—Cushman, Darby & Cushman

[57] ABSTRACT

An electronic voltage regulator for an ac electric generator precisely controls the generator output voltage and enhances motor starting ability. A filtered dc representation of the output voltage of the generator is produced by circuitry sensing the output voltage of the generator and rectifying to dc and filtering the voltage sense to obtain a relatively smooth dc voltage which is directly proportional to the output voltage of the generator and has on it a small amount of ripple voltage. A dc voltage which is proportional to the frequency of the generator is also produced by circuitry means which senses the frequency of the generator and produces a dc voltage proportional to the frequency of the generator up to a predetermined maximum frequency, not increasing above that maximum, and for amplifying the voltage produced. A comparator circuit compares the dc voltages. A small amount of hysteresis is built into the comparator circuit so that its output switches on and off in synchronization with the small ripple voltage. A signal produced from the comparator circuit controls the application of current from a quad winding of the generator to the generator field, to maintain the output voltage of the generator substantially constant.

19 Claims, 1 Drawing Figure

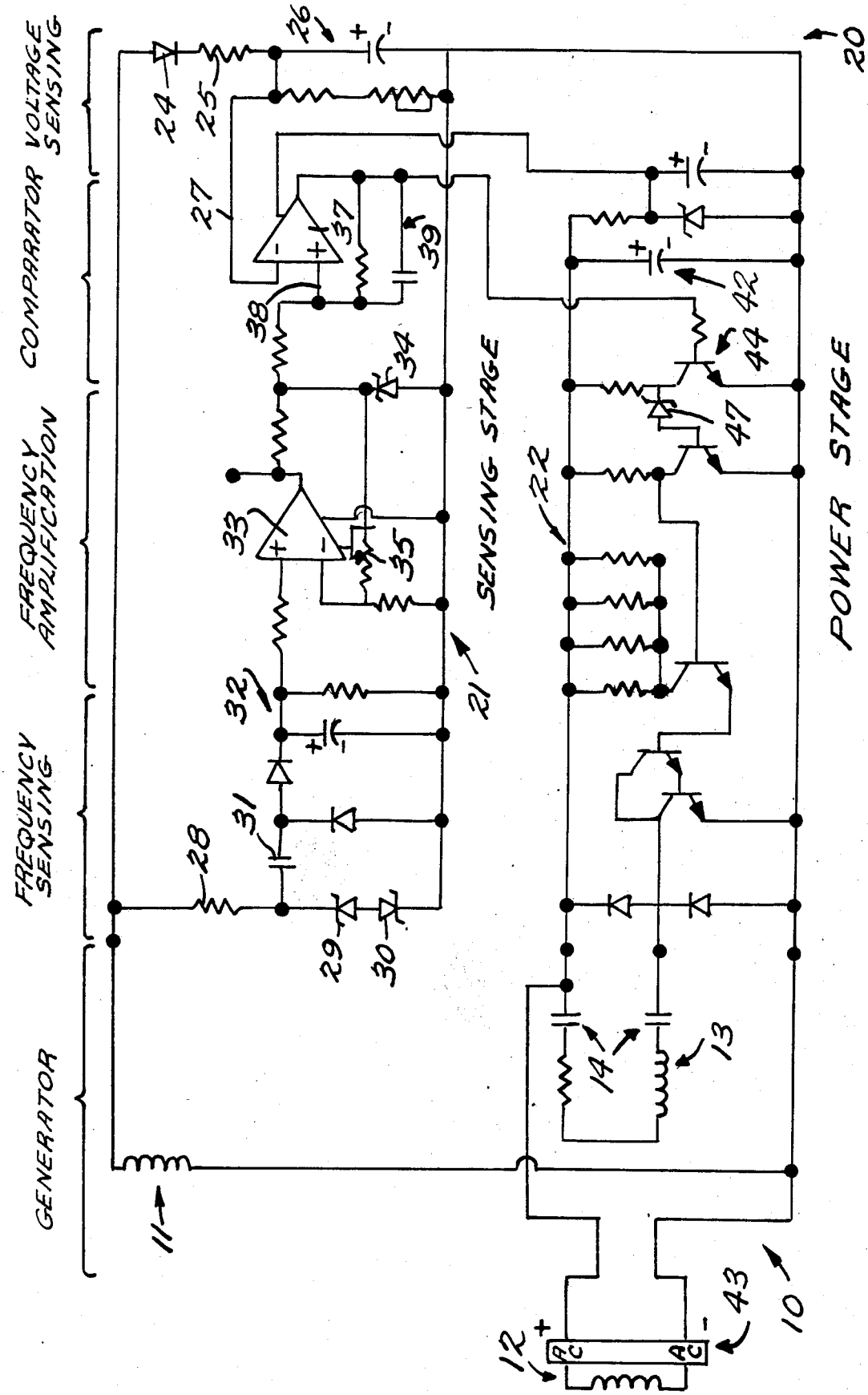

ELECTRONIC VOLTAGE REGULATOR

BACKGROUND AND SUMMARY OF THE INVENTION

In the production of gasoline powered ac generators or the like, it is highly desirable to provide precise voltage regulation, and to provide good motor starting ability. Commercially this is often done utilizing a power transformer. Commercial generators produced utilizing a power transformer to regulate the output voltage, however, typically have regulated output voltage to about ±4%, and motor starting ability is about 0.35 hp/kw. These values are less than desired.

According to the present invention, an electronic voltage regulator is provided which utilizes generator field control for regulating the output voltage of an ac generator while improving motor starting ability. The electronic voltage regulator according to the present invention produces the desired results in an efficient and cost effective manner with a minimum number of components. Utilizing the invention it is possible to regulate the output voltage of the generator so that it is about ±0.8%, and to provide a motor starting ability of about 0.75 hp/kw.

According to the present invention, an electronic voltage regulator is provided for an ac electric generator having a field, output voltage and frequency. First means are provided for producing a filtered dc representation of the generators output voltage. Second means are provided for producing a dc voltage which is proportional to the frequency of the generator. Third means are provided for comparing the dc voltages produced by the first and second means, and a fourth means are provided for using a comparison of the voltages to control the generator field and thereby regulate the output voltage of the generator.

The means for producing the filtered dc representation of the output voltage includes means for sensing the output voltage, rectifying it to dc, and filtering it to obtain a relatively smooth dc voltage, which is directly proportional to the output voltage of the generator. A small amount of ripple voltage is provided.

The means for producing a dc voltage which is proportional to the frequency of the generator comprises novel circuitry itself. The circuitry includes means for sensing the frequency of the ac output voltage including a resistor and a pair of back-to-back zener diodes, to produce a square wave. The circuitry further comprises means for producing a dc voltage proportional to the sensed frequency, which means comprises a high pass RC filter for differentiating the square wave to produce a constant amplitude pulse, means for rectifying the pulse to dc, and an RC network for averaging it. The circuitry further comprises means for amplifying this dc voltage and clamping it so that up to a maximum sensed frequency the small dc voltage produced is proportional to the sensed frequency, but does not increase above that maximum. Such means includes an integrated circuit operational amplifier which has a zener diode to clamp maximum of the voltage.

The means for comparing the dc voltages produced by the first and second means includes an operational amplifier comparator circuit. This circuit has a small amount of hysteresis so that the output of the comparator switches on and off in synchronization with the small ripple voltage from the first means.

The fourth means, for using the comparison of the dc voltages to control the generator field, comprises a power stage which amplifies the switching signal from the comparator to a level which can control the field current. The power stage is powered by a separate winding on the generator which is rectified to dc and filtered by a large capacitor, this voltage then being applied directly to the generator field in a controlled manner by the output by the comparator. Thus, as load is applied to the generator the ac output voltage will tend to decrease. This decrease is sensed by the voltage sensing circuitry and causes the duty cycle of the comparator stage to increase. This in turn causes the generator's field current to increase. The increase in field current compensates for the additional load and tends to maintain the generators ac output voltage constant (e.g. within about ±0.8%).

It is the primary object of the present invention to provide a simple and effective electronic voltage regulator for an ac electric generator and effective circuitry for producing an amplified dc voltage in response to sensed frequency, associated therewith. This and other objects of the invention will become clear from an inspection of the detailed description of the invention, and from the appended claims.

BRIEF DESCRIPTION OF THE DRAWING

The FIGURE of drawing is a simplified schematic of an exemplary electronic voltage regulator according to the present invention, shown in operative association with an ac electric generator.

DETAILED DESCRIPTION OF THE DRAWING

An ac electric generator which is to be regulated according to the present invention is shown generally by reference numeral 10 in the drawing. The generator 10 typically is powered by a gasoline engine, although any suitable power source can be utilized for effecting rotation of the armature rotor. The generator 10 includes main windings 11 (e.g. 120 volts ac), a quad or excitation winding 12 and a field 13 associated with a slip ring 14.

The electronic voltage regulator according to the present invention, for regulating the output voltage of the generator 10, is shown generally by reference number 20, and includes a sensing stage 21 and a power stage 22. One of the components of the sensing stage 21 is a voltage sensing section which includes diode 24, and resistor 25, and RC network 26 which rectifies the voltage to dc and filters it, to obtain a relatively smooth dc voltage in line 27 which is directly proportional to the average ac output voltage of the generator 10. A small amount of ripple voltage is designed in at this stage.

The voltage regulator 20 also comprises means for sensing the ac frequency of the generator 10. The frequency sensing portion of the regulator 20 comprises the resistor 28 and back-to-back zener diodes 29, 30. The ac output voltage of the generator 10 is dropped through the resistor 28 and the zener diode 29, 30 producing the square wave. The square wave is then differentiated by a high pass RC filter network provided by resistor 28 and capacitor 31 to produce a pulse whose amplitude remains constant. This pulse is rectified to dc and averaged by RC network 32, producing a small dc voltage which is proportional to frequency.

The regulator 20 also comprises a frequency amplification portion for amplifying the dc voltage from the frequency sensing stage. Frequency amplification is accomplished utilizing operational amplifier 33 which has a zener diode 34 to clamp the maximum output voltage of the frequency amplification stage. The circuitry is adjusted, including by utilizing rheostat 35, so that below a predetermined frequency the voltage out of the operational amplifier 33 is proportional to frequency, but above a predetermined frequency the voltage is clamped to the zener diode 34 voltage, and cannot increase with increasing frequency. Typical predetermined values of the frequency which would be selected would be 60 Hz, or 50 Hz. Where 60 Hz is selected, the output voltage from operational amplifier 33 is proportional to the sensed frequency up to 60 Hz, but does not increase above that value.

The regulator 20 according to the invention also comprises a comparator stage. The comparator stage includes operational amplifier 37 which has one input, line 27, from the voltage sensing stage, and another input, line 38, from the frequency amplification stage. Thus, the operational amplifier comparator circuit compares the voltage across the zener diode 34 to that from the voltage sensing stage. The operational amplifier 37 comparator circuitry is shown generally by reference number 39. The comparator circuit has a small amount of hysteresis designed into it. As a result, the output of the comparator switches on and off in synchronization with the small ripple voltage on the voltage supplied by line 27.

The output of the comparator stage drives the power stage 22 which in turn amplifies the switching signal to a level which can control the current in the field 13 of the generator 10. The power stage is powered by the separate quad winding 12. The output voltage from this quad winding 12 is rectified to dc by bridge rectifier 43, and filtered by large capacitor 42. This voltage is then applied to the generator field 13 in a controlled manner by the output of comparator circuitry 39, through transistor 44.

It should be noted that in order to facilitate starting of the generator 10, the regulator 20 has incorporated into it a bypass stage to allow the residual voltage of the generator 10 to feed unimpeded into the field 13 implemented by Zener diode 47. As the generator 10 builds up output voltage Zener diode 47 senses the voltage from the quad winding 12 and switches the regulator 20 into normal operation when the quad winding 12 voltage exceeds the voltage rating of Zener diode 47.

It is particularly pointed out that the frequency sensing stage is designed the way it is in order to avoid "bogging" of the engine in the event of a small overload. The output voltage decreases proportionally with engine speed if the speed falls below the predetermined frequency (e.g. 60 Hz). Without this feature, the regulator 20 would attempt to produce more power than the engine is capable of and would not be able to recover to normal operation upon removal of the overload. Normal operation could only be resumed by removal of almost all of the load.

It will thus be seen that according to the present invention as load is applied to the generator 10, the ac output voltage will tend to decrease. This decrease is sensed by the voltage sensing stage of regulator 20, and causes the duty cycle of the comparator of regulator 20 to increase. This increase, operating through the power stage 22 will cause the current in the generator field 13 to increase, and this increase in field current will compensate for the additional load and thus tend to maintain the generator ac output voltage constant. As the load is removed, the output voltage tends to increase, which increase is sensed by the voltage sensing stage of the regulator and which causes the duty cycle of the comparator stage to decrease. This causes the generator field current to also decrease, compensating for the reduction in load and maintaining the generator ac output voltage substantially constant.

It will thus be seen that according to the present invention a simple operationally and cost effective electronic voltage regulator, including frequency sensing circuitry associated therewith, has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An electronic voltage regulator for an ac electric generator having a field, output voltage, and frequency, comprising:
   first means for producing a filtered dc representation of the output voltage of the generator;
   second means for producing a small dc voltage which is proportional to the frequency of the generator;
   third means for comparing the small dc voltages produced by said first and second means; and
   fourth means for using the comparison of said third means to control the generator field and thereby regulate the output voltage of the generator;
   said regulator including a quad winding for the generator, said generator field being powered by said quad winding, wherein said fourth means controls the supply of emf from the quad winding to the field.

2. A regulator as recited in claim 1 further comprising means for rectifying the output voltage from the quad winding to dc and filtering it before it is supplied to the field.

3. An electronic voltage regulator for an ac elctric generator having a field, output voltage, and frequency, comprising:
   first means for producing a filtered dc representation of the output voltage of the generator;
   second means for producing a small dc voltage which is proportional to the frequency of the generator;
   third means for comparing the small dc voltages produced by said first and second means; and
   fourth means for using the comparison of said third means to control the generator field and thereby regulate the output voltage of the generator;
   said second means comprising means for sensing the frequency of the generator, means for producing a dc voltage proportional to the sensed frequency, and means for amplifying the dc voltage and clamping it so that up to a maximum predetermined sense frequency, the dc voltage produced is proportional to the sensed frequency but does not increase to above the maximum.

4. A regulator as recited in claim 3, wherein said means for sensing the frequency comprises a resistor and a pair of back-to-back zener diodes to produce a square wave.

5. A regulator as recited in claim 3, wherein said means for producing the dc voltage proportional to the sensed frequency comprises a high pass RC filter for differentiating the square wave to produce a constant amplitude pulse, and means for rectifying the pulse to dc and averaging it.

6. A regulator as recited in claim 5, wherein said means for amplifying the dc voltage and clamping it comprises an operational amplifier and a zener diode clamp.

7. An electronic voltage regulator for an ac electric generator having a field, output voltage, and frequency, comprising:
   first means for producing a filtered dc representation of the ouput voltage of the generator;
   second means for producing a small dc voltage which is proportional to the frequency of the generator;
   third means for comparing the small dc voltages produced by said first and second means; and
   fourth means for using the comparison of said third means to control the generator field and thereby regulate the output voltage of the generator;
   said first means comprising a voltage sensor, and an Rc network for obtaining a relatively smooth dc voltage which is proportional to the average of the ac output voltage of the generator, and which has a small amount ripple voltage.

8. A regulator as recited in claim 7, wherein said third means comprises a comparator circuit having a small amount of hysteresis, so that the output of the comparator circuit switches on and off in synchronization with the small ripple voltage on the voltage from said first means.

9. An electronic voltage regulator for an ac electric generator having a field, output voltage, and frequency, comprising:
   first means for producing a filtered dc representation of the output voltage of the generator;
   second means for producing a small dc voltage which is proportional to the frequency of the generator;
   third means for comparing the small dc voltages produced by said first and second means; and
   fourth means for using the comparison of said third means to control the generator field and thereby regulate the ouput voltage of the generator;
   said regulator further comprising bypass circuitry for facilitating generator start-up by allowing the residual voltage of the generator to feed unimpeded into the generator field until the output voltage of the generator has built up.

10. An electronic voltage regulator for and ac electric generator having a output voltage and frequency, comprising:
    first means for sensing the output voltage of said generator;
    second means for rectifying to dc and filtering the voltage sensed by said first means, to obtain a relatively smooth dc voltage which is directly proportional to the output voltage of said generator;
    third means for sensing the frequency of said generator and producing a small dc voltage proportional to the frequency of the generator up to a maximum, but not increasing above that maximum;
    fourth means for amplifying the small dc voltage produced by said third means;
    fifth means for comparing the dc voltages from said second and fourth means; and
    sixth means for controlling said generator in response to said fifth means to maintain the ac output voltage of the generator substantially constant.

11. A regulator as recited in claim 10 wherein a small ripple voltage is provided on the small dc voltage produced by said second means; and wherein said fifth means comprises a comparator circuit means having a small amount of hysteresis so that the output of the comparitor circuit switches on and off in synchronization with the small ripple voltage on the dc voltage produced by said second means.

12. A regulator as recited in claim 11 wherein the predetermined maximum frequency associated with said third means is about 60 Hz.

13. A regulator as recited in claim 10 further comprising by pass circuitry means for facilitating start up of the generator by allowing the residual voltage of the generator to facilitate increasing the generators output voltage until that output voltage build up.

14. A regulator as recited in claim 10 wherein said third means comprises an operational amplifier and a zener diode clamp associated therewith.

15. A regulator as recited in claim 10, wherein said third means comprises means for sensing the frequency of the ac output voltage of the generator, comprising: a resistor and a pair of back-to-back zener diodes to produce a square wave; and means for producing a dc voltage proportional to the sensed frequency, comprising a high pass RC filter for differentiation the square wave to produce a constant amplitude pulse and means for rectifying the pulse to dc voltage and averaging it.

16. Circuitry for producing an amplified dc voltage in response to the frequency of an ac current generating device, comprising:
    means for sensing the frequency of the ac output voltage of the current generating device, comprising a resistor and a pair of back-to-back zener diodes, to produce a square wave;
    means for producing a dc voltage proportional to the sensed frequency, comprising a high pass RC filter for differentiating the square wave to produce a constant amplitude pulse, and means for rectifying the pulse to dc and averaging it; and
    means for amplifying the dc voltage and clamping it so that up to a maximum the predetermined dc voltage produced is proportional to the sensed frequency, but does not increase above that maximum.

17. Circuitry as recited in claim 16 wherein said means for amplifying and clamping comprises an operational amplifier and a zener diode claim.

18. Circuitry as recited in claim 17 further comprising a rheostat operatively connected to the operational amplifier for adjusting the maximum predetermined frequency.

19. Circuitry as recited in claim 16 wherein said means for rectifying the pulse to dc and averaging it comprises an RC network.

* * * * *